United States Patent
Fang et al.

(10) Patent No.: US 9,854,937 B2
(45) Date of Patent: Jan. 2, 2018

(54) PLASMA NON-STICK PAN AND MANUFACTURING METHOD THEREOF

(71) Applicant: ZHEJIANG SANHE KITCHENWARE CO., LTD., Ningbo, Zhejiang (CN)

(72) Inventors: Cheng Fang, Zhejiang (CN); Qiang Cheng, Zhejiang (CN)

(73) Assignee: ZHEJIANG SANHE KITCHENWARE CO., LTD., Ningbo (CN)

(*) Notice: Subject to any disclaimer, the term of this patent is extended or adjusted under 35 U.S.C. 154(b) by 0 days.

(21) Appl. No.: 15/362,843

(22) Filed: Nov. 29, 2016

(65) Prior Publication Data

US 2017/0071401 A1    Mar. 16, 2017

Related U.S. Application Data

(63) Continuation of application No. PCT/CN2015/078603, filed on May 8, 2015.

(30) Foreign Application Priority Data

Mar. 17, 2015   (CN) .......................... 2015 1 0116150

(51) Int. Cl.
*C23C 4/06* (2016.01)
*C23C 4/12* (2016.01)
(Continued)

(52) U.S. Cl.
CPC ............. *A47J 36/025* (2013.01); *A47J 27/00* (2013.01); *A47J 27/002* (2013.01); *A47J 36/02* (2013.01);
(Continued)

(58) Field of Classification Search
CPC ...................................................... B32B 15/01
See application file for complete search history.

(56) References Cited

U.S. PATENT DOCUMENTS

| 2012/0048912 A1* | 3/2012 | Hu | F01D 5/005 228/119 |
| 2012/0132655 A1* | 5/2012 | Perillon | A47J 36/02 220/573.1 |

FOREIGN PATENT DOCUMENTS

| CN | 102421340 A | 4/2012 |
| CN | 102871529 A | 1/2013 |
| CN | 103184399 A | 7/2013 |

OTHER PUBLICATIONS

Thomas-Sourmail, <http://thomas-sourmail.net/coatings/mcraly.html>, accessed Jun. 20, 2017.*

(Continued)

*Primary Examiner* — Humera Sheikh
*Assistant Examiner* — Lucas Wang

(57) ABSTRACT

The present invention discloses a plasma non-stick pan and manufacturing method thereof. The plasma non-stick pan comprises a pan body and a non-stick layer applied to the pan body; a plasma layer is provided between the non-stick layer and the pan body, and the plasma layer comprises a MCrALY layer sprayed to the surface of the pan body and a mixture layer sprayed outside of the MCrALY layer, and the mixture layer is composed of MCrALY particles and metal oxide particles. The MCrALY layer has good toughness and strong adhesion, and it is easy to bind with the substrate with high fastness after binding, playing a buffering role and laying a foundation for the subsequent spraying of mixture layer.

6 Claims, 1 Drawing Sheet

(51) Int. Cl.
  B05D 1/02      (2006.01)
  A47J 27/00     (2006.01)
  A47J 36/02     (2006.01)
  A47J 36/04     (2006.01)
  B05D 5/08      (2006.01)
  C23C 4/00      (2016.01)
  C23C 4/073     (2016.01)
  C23C 4/134     (2016.01)
  B05D 7/14      (2006.01)
  B05D 7/00      (2006.01)
  C23C 4/02      (2006.01)
  C23C 28/02     (2006.01)
  B05D 1/00      (2006.01)

(52) U.S. Cl.
  CPC .......... *A47J 36/04* (2013.01); *B05D 1/02* (2013.01); *B05D 5/08* (2013.01); *B05D 5/086* (2013.01); *B05D 7/14* (2013.01); *B05D 7/54* (2013.01); *B05D 7/5883* (2013.01); *C23C 4/00* (2013.01); *C23C 4/02* (2013.01); *C23C 4/073* (2016.01); *C23C 4/134* (2016.01); *C23C 28/022* (2013.01); *C23C 28/027* (2013.01); *C23C 28/028* (2013.01); *B05D 1/62* (2013.01); *B05D 2350/63* (2013.01); *B05D 2350/65* (2013.01)

(56) References Cited

OTHER PUBLICATIONS

International Search Report of counterpart PCT Patent Application No. PCT/CN2015/078603 dated Dec. 4, 2015.

\* cited by examiner

PLASMA NON-STICK PAN AND MANUFACTURING METHOD THEREOF

CROSS REFERENCE TO RELATED APPLICATIONS

The present application is a Continuation Application of PCT application No. PCT/CN2015/078603 filed on May 8, 2015, which claims the benefits of Chinese Patent Application No. 201510116150.3 filed on Mar. 17, 2015, the contents of which are hereby incorporated by reference.

FIELD OF THE INVENTION

The present invention relates to the field of kitchen utensil, in particular, to a plasma non-stick pan and manufacturing method thereof.

BACKGROUND

Pan is a common cooking utensil in the kitchen. In order to facilitate cleaning and cooking, more and more people start to use non-stick pans; however, there are many defects for the existing non-stick pans, for example, the die-casting pan body needs multiple casting before molding, which is time-consuming, with low efficiency; in another example, the Chinese patent CN102871529 discloses an aluminum alloy non-stock pan with hard surface and processing thereof, wherein the operating process is molding→finishing→oxidation→spraying→sintering. Its finishing operation is just to have a simple cleaning on the pan body, which cannot remove the oil dirt and burrs carried in the manufacturing process completely. Although there are some oil removing and cleaning operations in the prior art, it cannot achieve good oil removing and deburring effect due to unreasonable steps and poor liquid preparation effect, affecting the use and safety of the pan body; in addition, its membrane formation process needs high temperature, and the painting and sintering operations after oxidation, which affects the membrane preparation speed and the using effect of the membrane.

In addition, the existing aluminum alloy non-stick pans have many defects, such as spraying a softer non-stick coating on the aluminum alloy due to soft aluminum substrate. In actual use, since the coating and substrate are relatively soft, it is difficult to resist abrasion and its anti-scratch and wear is extremely poor; after improvement, aluminum alloy hard anodizing technology is added, and the oxide film hardness reaches 400 HV (bare aluminum hardness 250 HV), appropriately increasing the hardness of the substrate and improving the overall anti-scratch wear resistance. But the hard anodizing hardness is difficult to resist harder materials such as daily used shovel, fried snails. The experiments have shown that, when the hard anodized cookware is used for fried snails with a shovel, obvious scratches can be seen in 15 min. Later, industrial technicians attempt to spray a ceramic coating to enhance the hardness on the aluminum substrate through plasma technologies, since the plasma ceramic coating has the effect of high hardness (hardness 1800 HV) and high resistance to corrosion; but the process has two big problems, one is that the plasma ceramic oxide layer is too brittle, the brittleness is higher when combined to the aluminum substrate, which is easy to crack when hit by a shovel; the second is that the plasma layer and the non-stick coating have poor adhesion, and the plasma layer is very dense, unable to effectively bind with the PTFE coating, and the service life is shortened after spraying.

SUMMARY

In order to overcome the shortcoming of the prior art, the invention provides a wear-resistant and scratch-resistance plasma non-stick pan and the manufacturing method thereof.

In order to achieve the above purposes, the present invention adopts the following technical solutions: A plasma non-stick pan, comprising a pan body and a non-stick layer applied to the pan body, wherein a plasma layer is provided between the non-stick layer and the pan body, the plasma layer comprises a MCrALY layer sprayed to the surface of the pan body and a mixture layer sprayed outside of the MCrALY layer, and the mixture layer is composed of MCrALY particles and metal oxide particles. The MCrALY layer has good toughness and strong adhesion, and it is easy to bind with the substrate with high fastness after binding, playing a buffering role and laying a foundation for the subsequent spraying of mixture layer. The mixture layer integrates MCrALY particles and metal oxide particles, with higher hardness and brittleness, greatly enhancing the hardness and wear resistance on the surface of pan body; with the buffer function of the MCrALY layer, the mixture layer can achieve solid and reliable, persistent bonding with the MCrALY layer while ensuring high hardness and brittleness.

Further, a cushion layer is provided between the MCrALY layer and the mixture layer, the cushion layer is composed of a mixture of 70-80% MCrALY and 20-30% metal oxide particles. The setting of the cushion layer produces a slower transition and cushioning effect, more conducive to improve the adhesion and the durability between the coatings, and further improve the hardness and thickness of the entire plasma coating, to achieve the best state of the overall wear resistance and hardness of the pan body.

Preferably, the mixture layer is composed of a mixture of 40-50% MCrALY particles and 50-60% of metal oxide particles. The plasma coating formed by this ratio has the best surface hardness and optimum adhesion. 50-60% metal oxide in the surface layer plays a major role in hardness supporting, with a hardness as high as 1800-2000 HV. If the content is less than 50%, the coverage is inadequate and the hardness is not enough; and if the content is higher than 60%, local accumulation may occur, resulting in too brittle. A large number of experiments have shown that, the mixture of MCrALY and metal oxide under this range is the optimum distribution.

The invention further discloses a method for manufacturing the plasma non-stick pan, comprising the following steps:

(1) molding;
(2) oil removing: remove pan body surface oil dirt and scale, and dry;
(3) thermal coating;
(4) cleaning pan body, and drying;
(5) blasting: blasting to the pan body surface with 20# and 46# mixed corundum, to make the surface roughness of pan body Ra=7.0-10.0 μm; this roughness can make the 30-60 μm plasma coating to have the best adhesion;
(6) pre-heating, heat the pan body to 220-280° C.; when pre-heating under this temperature, the aluminum substrate is softened, and after softening, the substrate and the plasma layer can be bonded and fused together, and compared with the substrate under the steady state, the softened substrate has better fusion and adsorption;

(7) Spraying plasma layer: The powder MCrAlY particles are heated to molten or semi-molten state using a DC motor-driven plasma arc as a heat source, and sprayed to the pan body surface at a rate of 150 m/s, to form a firm MCrAlY layer attached to the pan body surface; and then the mixture of MCrALY powder particles and metal oxide particles are heated to molten or semi-molten state, sprayed to the pan body surface at a rate of 150 m/s, to form a mixture layer attached outside of the MCrALY layer;

(8) Spraying a primer layer: After spraying plasma layer, bake 5-10 min with a composition at the temperature of 120-280° C., to form a primer layer with thickness of 3-5 μm; this primer layer can be bonded with the plasma layer very reliably;

(9) Inner spraying: spraying PTEE coating on the inner surface of the pan body, and baking 10 min at 380-440° C., to form a PTFE coating layer with a thickness of 30-45 μm. By spraying a layer of primer layer made of special material outside the primer layer, the primer layer can not only effectively bind with plasma layer, but also bond with PTFE coating reliably, to effectively resolve the problem of easy falling-off of PTFE coating and guarantee the life of the non-stick pan.

Further, the mixture layer is composed of a mixture of 40-50% MCrALY particles and 50-60% metal oxide particles in the step (7). The mixture layer with this ratio has the best surface roughness, to enhance the non-stickness.

Preferably, a cushion layer is sprayed between the MCrAlY layer and the mixture layer in step (7), and the cushion layer is composed of a mixture of 70-80% MCrALY particles and 20-30% metal oxide particles.

Further, the metal oxide is selected from one of alumina, zirconia, titania, chromium oxide, titanium nitride and MCrAlY or a mixture thereof, and the particle size of the MCrAlY and metal oxide particles is 60-80 μm.

Preferably, the spraying thickness of the plasma layer in step (7) is 30-60 μm, the range of roughness is Ra=10-15 μm, Rz=50-70 μm. It achieves the best surface roughness under the value. Under the roughness, the fastness between the PTFE coating and plasma spraying mixture layer can be enhanced, to form microscopic peaks and valleys on the surface; during cooking, this kind of peak and valley structure can effectively resist against the external scratching, to achieve contact between 20% peaks and food and 80% of the coating is effectively protected, greatly extending the life and persistent non-stick performance of the non-stick coating.

Preferably, in the step (7), the spraying current of plasma layer is 400-800 A, the voltage is 25-45V, the powder feeding amount is 50-80 g/min, the spraying distance is 10-20 mm, and the spraying time is 90-120 s.

The molding of the plasma non-stick pan is achieved by 4800-ton pressure, with good molding effect and high efficiency. The surface is smoother to heat the pan body more evenly and heat transfer is faster. After molding operation, oil removal is set. The defatted powder at a concentration of 5% can quickly dissolve the oil and fat on the pan body surface, to achieve quick and thorough oil removal, and then cleaning is made with a polishing agent to neutralize alkaline liquid and polish the pan body surface. After thermal coating, re-cleaning is added; the pan body is cleaned with sodium hydroxide, and then the sodium hydroxide on the pan body surface is neutralized. The concentration, temperature and PH value of sodium hydroxide are set, to achieve better and quicker dirt removing effect. With less sodium hydroxide, it can achieve better effect of dirt removal, saving costs; in addition, sodium hydroxide can be removed with less dilute nitric acid, and dilute nitric acid has a good neutralizing effect for sodium hydroxide;

The roughness of pan body surface can enhance the solid adhesion and wear resistance by blasting, and the pan body surface will form microscopic peaks and valleys surface to improve the pan body fastness and anti-fatigue performance; after plasma spraying, the hardness of the pan body surface ca be up to 1500-2000 HV, increased by 3-4 times compared with hardness of previous oxidation films, further enhancing the durability of pan body; at the same time, the acid, alkali and saline resistance are increased by more than 2 times compared with oxidation film; and the sprayed PTFE coating can effectively and persistently bond with the plasma layer due to the transition effect of primer layer, and it can achieve very good non-stick performance by spraying a very thin layer. The pan body can resist a temperature of 300° C. within a short time, generally it can be used continually at 240~260° C., with significant thermal stability. It does not melt at high temperature or embrittle in a freezing temperature. The pan body surface will not attach water and oil dirt; and if a small amount of dirt exists, remove them by simple wiping; it is not subject to the corrosion of drugs and other chemicals; and even falling-off of the coating, only the broken layer is damaged at the peak positions due to the setting of plasma coating roughness, which will not involve other regions, to maintain the integrity of coatings in other regions.

In summary, the plasma non-stick pans in the invention have a remarkable thermal stability and non-tackiness, the pan body has high hardness, the non-stick layer is easy to fall off, with a long wear-resistance time, significantly improving its life.

DETAILED DESCRIPTION

The technical solutions in the invention are described explicitly and completely in combination with embodiments and drawings to allow technicians skilled in the art to understand them.

Figure 1:
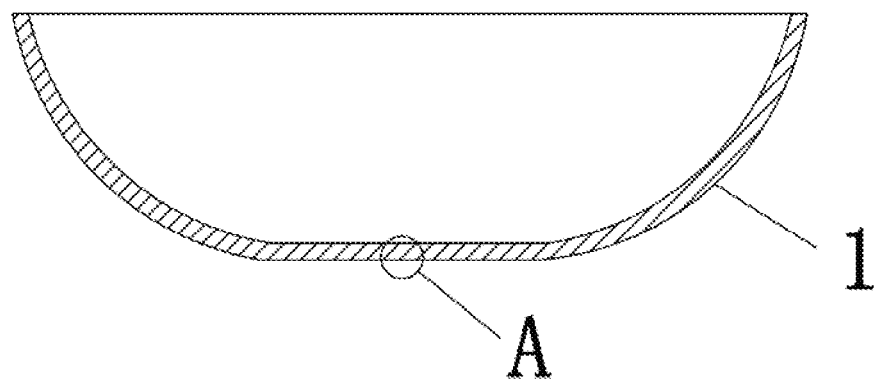
FIG. 1 is a structural diagram of this invention.
Figure 2:
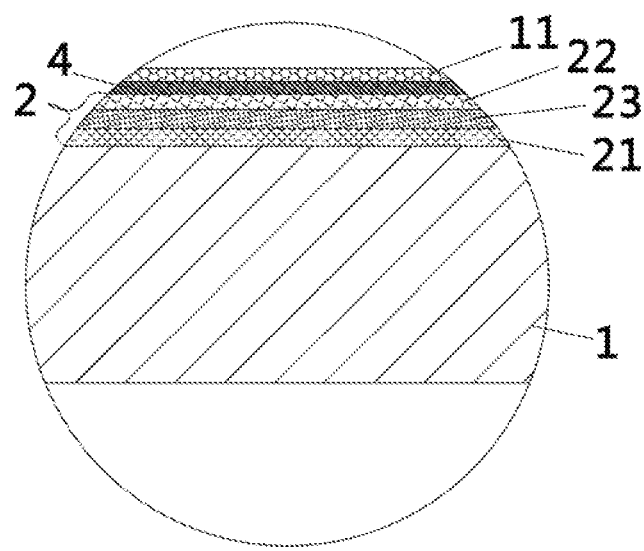
FIG. 2 is an enlarged view of A in FIG. 1.

Referring to FIG. 1 and FIG. 2, the thickness of various coatings in figure is not the actual proportion, which is enlarged for understanding. A plasma non-stick pan, comprising a pan body 1 and a non-stick layer 11 applied to the pan body, wherein a plasma layer 2 is provided between the non-stick layer 11 and the pan body, the plasma layer comprises a MCrALY layer 21 sprayed to the surface of the pan body 1 and a mixture layer 22 sprayed outside of the MCrALY layer 21, and the mixture layer is composed of MCrALY particles and metal oxide particles. By setting a special plasma layer between the non-stick layer and the pan body, the surface hardness of the pan body is significantly enhanced; the plasma layer is a dual layer structure; the MCrALY layer composed of MCrALY particles is bonded with the pan body substrate, with strong toughness and high adhesion to the substrate. The mixture layer is composed of MCrALY particles and metal oxide particles, with greater hardness; and through the transition and convergence of MCrALY layer, the mixture layer can be firmly attached to the substrate.

In order to improve a coating adhesion strength and abrasion resistance, a cushion layer 23 is provided between the MCrALY layer 21 and the mixture layer 22, the cushion layer is composed of a mixture of 70-80% MCrALY and 20-30% metal oxide particles, playing a transition role, to ensure that the entire plasma layer has the best hardness and adhesion under the optimum thickness.

Specifically, the mixture layer 22 is composed of a mixture of 40-50% MCrALY particles and 50-60% of metal oxide particles.

A method for manufacturing the plasma non-stick pan, comprising the following steps:

(1) molding. The pan body is die-casting molded by 4,800-ton pressure. It has dense texture. It can be heated more evenly then ordinary pan, with faster heat transfer, to achieve no fumes really.

(2) oil removing: Clean the pan body with 5% SCD nonfat powder to remove pan body surface oil dirt and scales at the pH of 13 and temperature at 40-50° C.; and then put the pan body into 3-5% SCD polishing agent to implement neutralizing and cleaning at room temperature and Ph 2-3; and then wash the pan body with water, then blow-dry the pan body surface.

(3) thermal coating; implement the thermal coating using the forging press at the pressure of 2,500 tons, to make the body more dense and homogeneous. The superconducting thermal coating technology can enhance the thermal efficiency by more than 20% compared with the ordinary cold coating (with holes) technology, saving energy and time.

(4) cleaning. Clean the pan body with 2-3% NaOH at a temperature of 30-40 □ and PH value 12-14; clean the pan body with water, then neutralize and cleaning the pan body using 1-2% dilute nitric acid at room temperature and PH 1-3; and then clean the pan body with water, dry the pan body surface;

(5) blasting: blasting to the pan body surface with 20 # and 46 # mixed corundum, to make the surface roughness of pan body Ra=7.0-10.0 μm;

(6) Pre-heating, heat the pan body to 220-280° C.; under the temperature, the surface hardness of the aluminum pan begins to drop, the surface tension drops to a lower state, to effectively combine with the subsequently coated plasma layer.

(7) Spraying plasma layer: The powder MCrALY particles are heated to molten or semi-molten state using a DC motor-driven plasma arc as a heat source, and sprayed to the pan body surface at a rate of 150 m/s, to form a firm MCrAlY layer attached to the pan body surface; and then the mixture of 70-80% MCrALY powder particles and 20-30% metal oxide particles are heated to molten or semi-molten state, sprayed to the pan body surface at a rate of 150 m/s, to form a mixture layer attached outside of the MCrALY layer; finally the mixture of 40-50% MCrALY powder particles and 50-60% metal oxide powder particles are heated to molten or semi-molten state, sprayed to the pan body surface at a rate of 150 m/s, to form a mixture layer attached outside of the cushion layer. A large number of experiments have demonstrated that, the mixture layer of 40-50% MCrALY powder particles and 50-60% metal oxide powder particles has the best surface hardness and best adhesion; 50-60% metal oxide is in the surface layer, playing a role of hardness supporting, with the hardness up to 1800-2000 HV; if the content is less than 50%, the coverage is not enough, hardness is not enough; if the content is higher than 60%, the local accumulation occurs, leading to brittleness. A large number of experiments have verified that, the mixture of metal oxide and MCrALY under this scope has the best distribution.

Specifically, the spraying current of plasma layer is 400-800 A, the voltage is 25-45V, the major gas pressure is from nitrogen, with the pressure of 40-60 psi; and the auxiliary gas pressure is from hydrogen, the pressure varies with the variance of voltage; the carrier gas is nitrogen, with the pressure of 40-60 psi, the powder feeding amount is 50-80 g/min, the spraying distance is 10-20 mm, and the spraying time is 90-120 s;

The spraying thickness of the plasma layer is 30-60 μm, the range of roughness is Ra=10-15 μm, Rz=50-70 μm. Through the above process, the adhesion force between the pan body and the plasma coating layer is ≥110 N/mm$^2$;

Specifically, the metal oxide is selected from one of alumina, zirconia, titania, chromium oxide, titanium nitride and MCrAlY or a mixture thereof, and the particle size of the MCrAlY and metal oxide particles is 60-80 μm; in the embodiment, zirconia is used;

(8) Spraying a primer layer: After spraying plasma layer, bake 5-10 min with a composition at the temperature of 120-280° C. to form a primer layer with thickness of 3-5 μm; specifically, the composition comprises 30-50% of peek (polyetheretherketone) and 35-40% of pes (polyether sulfone), which is prepared with other components of conventional adhesive coating by mixing evenly. Technicians skilled in the art can adjust the types and ratio of components as needed, as long as the contents of peek (polyetheretherketone) and pes (polyether sulfone) are controlled. The primer can enhance the adhesion between the PTFE coating and the plasma layer;

(9) Inner spraying: spraying PTEE coating on the inner surface of the pan body, and baking 10 min at 380-440° C., to form a PTFE coating layer with a thickness of 30-45 μm, to get the plasma non-stick pan in the invention.

In order to validate the performance of plasma non-stick pan in the invention, we conduct a series of tests on the pan body. The test process is as follows:

Test 1: Hot and cold impact on the pan body. Heat the pan body to 400□, maintain 1 min, then put into 0° C., after 30 consecutive times of impact, observe the coating on the pan body surface; no falling-off or cracking is found;

Test 2: impact of pan body with steel balls. Fall a 250 g steel ball to the pan body surface from a height of 1.2 mm vertically, to impact more than 5 points on the surface of the pan body, to observe the surface of the pan body, no falling-off or cracking is found.

Test 3: brine boiling: Put the pan body to 10% saline solution for boiling 24 h, to observe the surface of the pan body, and no corrosion is found.

Test 4: Hot oil boiling: add 500 g of soybean oil to the pan body to boil 30 min at the constant temperature of 220° C., to observe the surface of the pan body, and no corrosion or falling-off is found.

Test 5: acetic acid boiling. Add 5% acetic acid solution in the pan body to boil 15 min at the constant temperature of 100° C., to observe the surface of the pan body, and no corrosion or falling-off is found.

After these tests, pan body can still be used normally, thus confirming the performance of the non-stick of the present invention has been greatly improved:

(1) non-stickness: a very thin PTFE coating layer has a good non-stickness performance;

(2) Heat resistance: PTFE coating layer has excellent heat resistance and low temperature resistance; and in a short time, it can resist the high temperature of 300° C.; and usually it can be used continuously at 240~260° C. with a significant thermal stability, without melting at high temperature and no embrittlement in a freezing temperature;

(3) moisture resistance: PTFE coating layer surface has the performance of no-stickness of water and oil dirt; and if a small amount of dirt, you can remove them by simply wiping;

(4) Abrasion resistance: Have double performance of wear resistance and non-sticking;

(5) Corrosion resistance: resist corrosion of drugs and other chemicals;

(6) Anti-falling-off: Even if the coating is fallen off, only break and damage will occur at the peak point, which will not involve in other regions, to maintain the integrity of the coating in other regions.

In addition, the pan body has the following advantages: 1) the pan body surface is in a state of uniform peaks and valleys, denser and more bonding; 2) the pan body hardness is up to 1500-2000 HV, increased by 3-4 times compared with the hard oxide film; 3) The anti-scratch and wear-resistant hardness is increased by 3-4 times compared with the existing non-stick pan, with a longer service life; 4) stronger corrosion resistance. The acid, alkali and salt water resistances of metal ceramic membrane are increased by more than twice compared with the oxidation membrane.

Apparently, the above described are only partial rather than whole embodiments of the invention. It should be noted that, technicians skilled in the art can make a number of improvements and modifications without departing from the concepts and spirit of the invention, and these improvements and modifications should be considered within the scope of protection of the present invention.

What is claimed is:

1. A plasma non-stick pan comprising a pan body and a non-stick layer applied to the pan body, wherein a plasma layer is provided between the non-stick layer and the pan body, the plasma layer comprises a MCrAlY layer, where M stands for a transition metal, sprayed to the surface of the pan body and a mixture layer sprayed on top of the MCrAlY layer such that the mixture layer is located between the MCrAlY layer and the non-stick layer, and the mixture layer is composed of a mixture of 40-50% MCrAlY particles and 50-60% of metal oxide particles.

2. The plasma non-stick pan according to claim 1, wherein a cushion layer is provided between the MCrAlY layer and the mixture layer, the cushion layer is composed of a mixture of 70-80% MCrAlY particles and 20-30% metal oxide particles.

3. A method for manufacturing a plasma non-stick pan, comprising the following steps:

(1) molding a pan body;

(2) oil removing: removing surface oil dirt and scale on the pan body, and drying;

(3) forging the pan body using a forging press;

(4) cleaning the pan body, and drying;

(5) blasting: blasting to the pan body surface with 20# and 46# mixed corundum, to make the surface roughness of pan body Ra=7.0-10.0 μm;

(6) pre-heating: heating the pan body to 220-280° C.;

(7) spraying a plasma layer: MCrAlY powder particles where M stands for a transition metal, are heated to molten or semi-molten state using a DC motor-driven plasma arc as a heat source, and sprayed to the pan body surface at a rate of 150 m/s, to form a firm MCrAlY layer attached to the pan body surface; and then a mixture of MCrAlY powder particles and metal oxide particles are heated to molten or semi-molten state, sprayed on top of the MCrAlY layer at a rate of 150 m/s, to form a plasma layer comprising the mixture layer attached on top of the MCrAlY layer;

(8) spraying a primer layer: after spraying the plasma layer, spraying a composition on the plasma layer, wherein the composition comprises polyetheretherketone (PEEK) and polyether sulfone (PES), and baking the coated pan body for 5-10 min at the temperature of 120-280° C., to form a primer layer with thickness of 3-5 μm;

(9) inner spraying: spraying polytetrafluoroethylene (PTFE) coating on the primer layer, and baking 10 min at 380-440° C., to form a PTFE coating layer with a thickness of 30-45 μm.

4. The method according to claim 3, wherein the metal oxide is at least one selected from the group consisting of alumina, zirconia, titania and chromium oxide, and the particle size of the MCrAlY and metal oxide particles is 60-80 μm.

5. The method according to claim 3, wherein the spraying thickness of the plasma layer in step (7) is 30-60 μm, the range of roughness of the plasma layer is Ra=10-15 μm, Rz=50-70 μm.

6. The method according to claim 3, wherein the plasma layer is sprayed at a current of 400-800 A, a voltage of 25-45V, a powder feeding amount of 50-80 g/min, a spraying distance of 10-20 mm, and a spraying time of 90-120 s.

* * * * *